US012609589B2

(12) United States Patent
Kim et al.

(10) Patent No.: US 12,609,589 B2
(45) Date of Patent: Apr. 21, 2026

(54) INSULATION SHIELDING MEMBER AND MOTOR USING THE SAME

(71) Applicant: HYUNDAI MOBIS CO., LTD., Seoul (KR)

(72) Inventors: Yong Ho Kim, Seoul (KR); Jae Hak Lee, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 236 days.

(21) Appl. No.: 18/379,911

(22) Filed: Oct. 13, 2023

(65) Prior Publication Data

US 2024/0171045 A1 May 23, 2024

(30) Foreign Application Priority Data

Nov. 21, 2022 (KR) ......................... 10-2022-0156059

(51) Int. Cl.
| | |
|---|---|
| *H02K 11/01* | (2016.01) |
| *H02K 3/34* | (2006.01) |
| *H02K 3/487* | (2006.01) |
| *H02K 21/14* | (2006.01) |

(52) U.S. Cl.
CPC ........... *H02K 11/014* (2020.08); *H02K 3/345* (2013.01); *H02K 3/487* (2013.01); *H02K 21/14* (2013.01)

(58) Field of Classification Search
CPC .......... H02K 3/345; H02K 3/34; H02K 3/525; H02K 3/487; H02K 11/014; H02K 11/02; H02K 11/028
USPC ......................................................... 310/214
See application file for complete search history.

(56) References Cited

U.S. PATENT DOCUMENTS

| | | | | |
|---|---|---|---|---|
| 5,821,652 A | * | 10/1998 | Hyypio | H02K 11/0141 310/83 |
| 2012/0161570 A1 | * | 6/2012 | Schutten | H02K 3/487 310/215 |

FOREIGN PATENT DOCUMENTS

KR          10-2387286  B1     4/2022

* cited by examiner

*Primary Examiner* — Christopher M Koehler
*Assistant Examiner* — Viswanathan Subramanian
(74) *Attorney, Agent, or Firm* — Morgan, Lewis & Bockius LLP

(57) ABSTRACT

Provided are an insulation shielding member which may insulate a coil and a stator core from each other, and simultaneously, shield an electric field caused by the coil, and a motor using the same. The insulation shielding member of the present disclosure may perform not only an insulation function but also a shielding function simultaneously, and shield the electric field caused by the coil to prevent corrosion from occurring in a bearing, thereby reducing the vibration and noise of the motor.

2 Claims, 7 Drawing Sheets

[FIG. 3]
200-1(210, 230, 240)
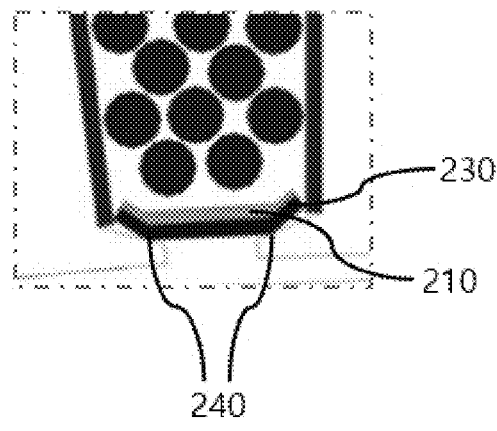
230
210
240
[FIG. 4]
200-2(210, 230, 240)
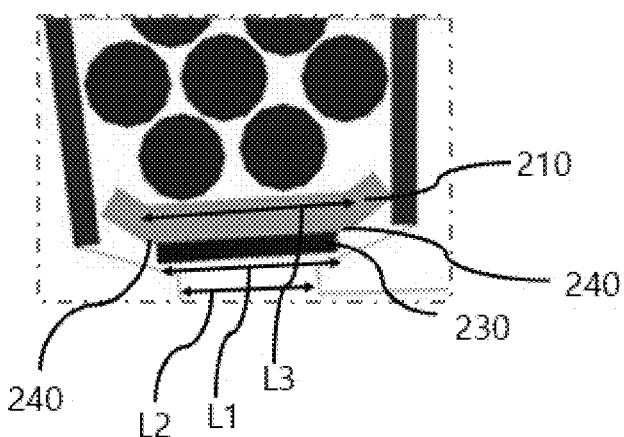
210
240
230
240     L2     L1     L3

[FIG. 5]
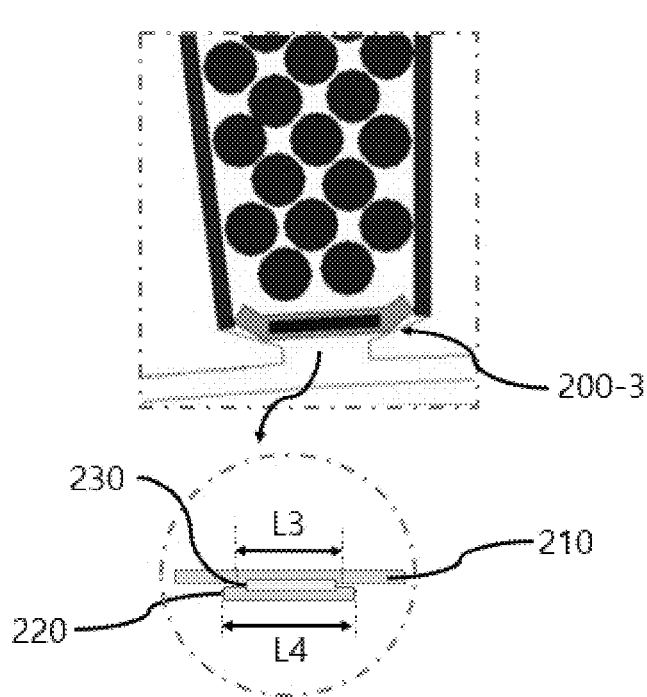

[FIG. 6]
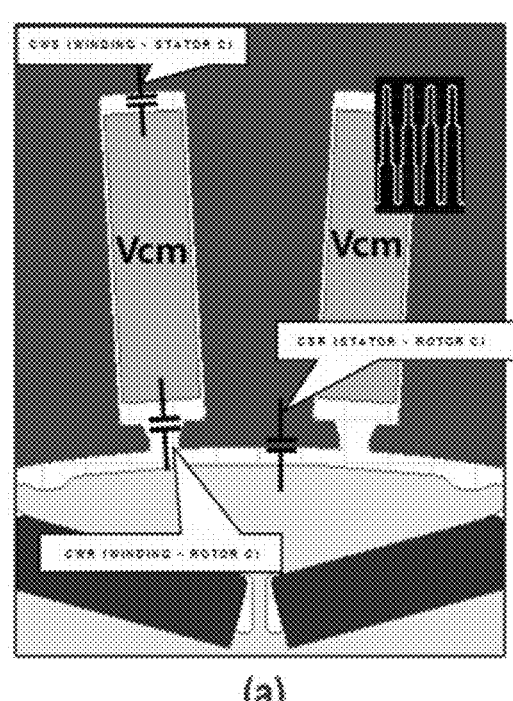
(a)
$$C = \frac{Q}{V} \qquad C = \frac{\varepsilon A}{d}$$
| | | |
|---|---|---|
| C : | CAPACITANCE | [F] |
| Q : | ELECTRIC CHARGE | [C] |
| V : | VOLTAGE | [V] |
| $\varepsilon$ : | PERMITTIVITY BETWEEN PARALLEL PLATES | [F/m] |
| A : | AREA OF PARALLEL PLATE | [m²] |
| d : | DISTANCE BETWEEN PARALLEL PLATES | [m] |
(b)

[FIG. 7]
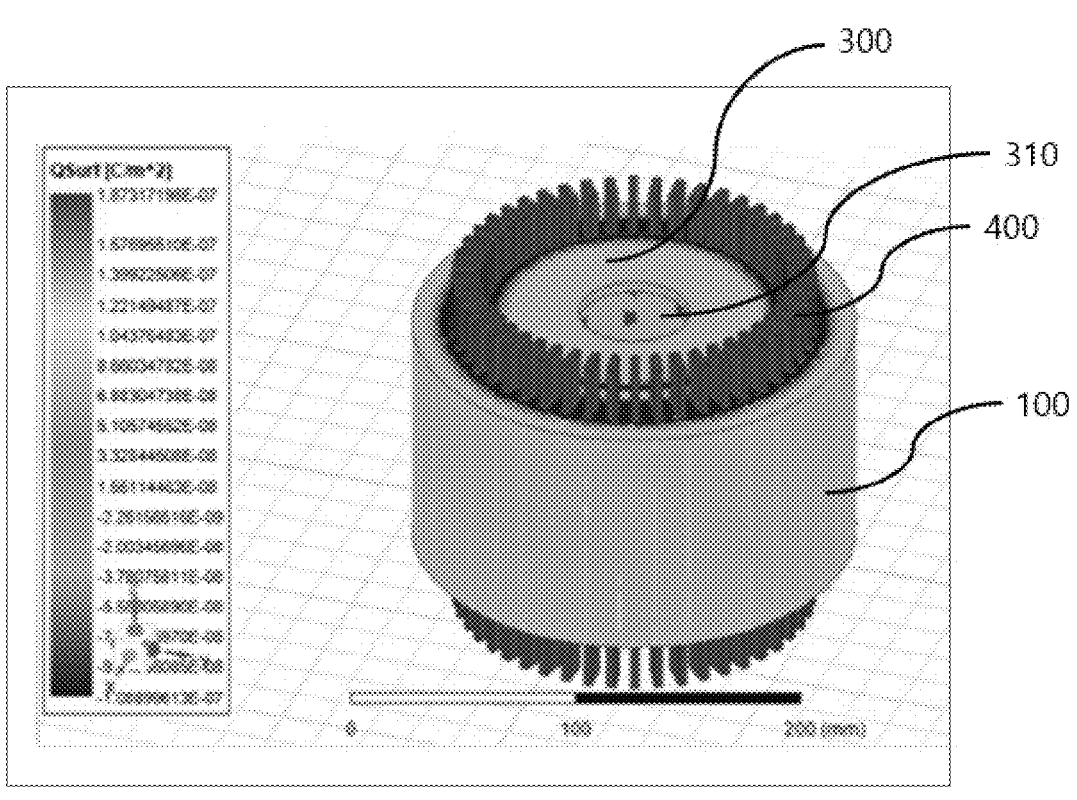

[FIG. 8]
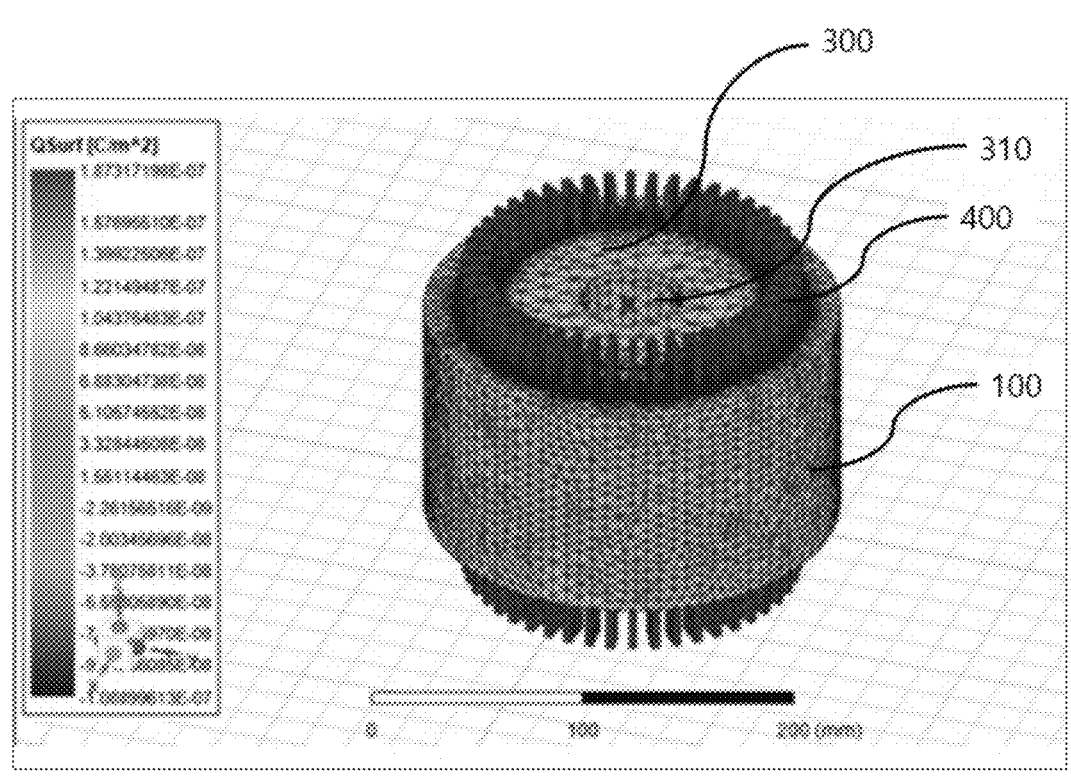

INSULATION SHIELDING MEMBER AND MOTOR USING THE SAME

CROSS-REFERENCE TO RELATED APPLICATIONS

This application claims priority under 35 U.S.C. § 119 to Korean Patent Application No. 10-2022-0156059, filed on Nov. 21, 2022, in the Korean Intellectual Property Office, the disclosure of which is incorporated herein by reference in its entirety.

TECHNICAL FIELD

The following disclosure relates to a motor.

BACKGROUND

A motor is a device converting electrical energy into mechanical work by using a strength received by a current in a magnetic field. The motor may be widely used in various fields such as an electronic product and an electric vehicle.

The motor may generally include a stator and a rotor. The stator may include a stator core having a plurality of radially formed teeth and a plurality of slots formed between the teeth. A coil may be wound in the slot.

An insulation member may be inserted into the slot to insulate the coil and the stator core from each other. The insulation member may usually use an insulation sheet made of an insulation material.

When the motor is driven, an axis voltage may be generated in the rotor by a voltage applied to a stator coil. A motor bearing may be corroded by the axis voltage.

An electric field caused by the coil may pass through the insulation sheet, and accordingly, the insulation sheet alone cannot prevent the corrosion.

RELATED ART DOCUMENT

Patent Document

Korean Patent No. 10-2387286 (registered on Apr. 20, 2022)

SUMMARY

An embodiment of the present disclosure is directed to providing an insulation shielding member which may insulate a coil and a stator core from each other, and simultaneously, shield an electric field caused by the coil, and a motor using the same.

In one general aspect, an insulation shielding member which is disposed in an opening of a slot formed in a stator core of an electronic motor including a stator and a rotor includes: a first insulation part formed on one surface of the insulation shielding member, and insulating the stator core and a coil inserted into the slot from each other; a shielding part formed on the other surface of the insulation shielding member, and shielding an electric field caused by the coil; and a bent part having both ends each bent in one direction and seated inside confrontation parts facing each other in the opening.

In another general aspect, a motor includes: a stator core including a plurality of teeth parts radially formed on its inner circumference, and a plurality of slots each formed between the teeth parts and having an opening formed between confrontation parts facing each other at ends of the teeth parts; a coil inserted into the slot; an insulation member inserted between the slot and the coil; an insulation shielding member disposed in the opening of the slot; and a rotor having a rotation shaft connected to its center, and inserted into the stator core to be rotated relative to the stator core, wherein the insulation shielding member is the insulation shielding member in one general aspect.

BRIEF DESCRIPTION OF THE DRAWINGS

FIG. 1 is a schematic cross-sectional view of a portion of a stator coil using an insulation shielding member according to embodiments of the present disclosure.

FIG. 2 is a cross-sectional view schematically showing an enlarged slot of FIG. 1.

FIG. 3 is a view schematically showing an insulation shielding member according to a first embodiment of the present disclosure.

FIG. 4 is a view schematically showing an insulation shielding member according to a second embodiment of the present disclosure.

FIG. 5 is a view schematically showing an insulation shielding member according to a third embodiment of the present disclosure.

FIGS. 6 to 8 are views showing analysis results acquired by using the insulation shielding members according to the embodiments of the present disclosure.

DETAILED DESCRIPTION OF EMBODIMENTS

In order to fully understand the present disclosure, embodiments of the present disclosure are described in more detail with reference to the accompanying drawings. The embodiments of the present disclosure may be variously modified, and the scope of the present disclosure should not be construed as being limited to the following embodiments described in detail. The embodiments are provided to more fully explain the present disclosure to those skilled in the art. Therefore, the shapes of elements in the drawings may be exaggerated to emphasize a clearer explanation. It should be noted that the same member may be indicated by the same reference numeral in each drawing. In addition, the description omits detailed descriptions of known functions and configurations that may unnecessarily obscure the gist of the present disclosure.

Hereinafter, the description describes the embodiments of the present disclosure with reference to the accompanying drawings.

An insulation shielding member 200 may be disposed in an opening 130 of a slot 110 formed in a stator core 100 of a motor including a stator and a rotor 300.

Figure 1:
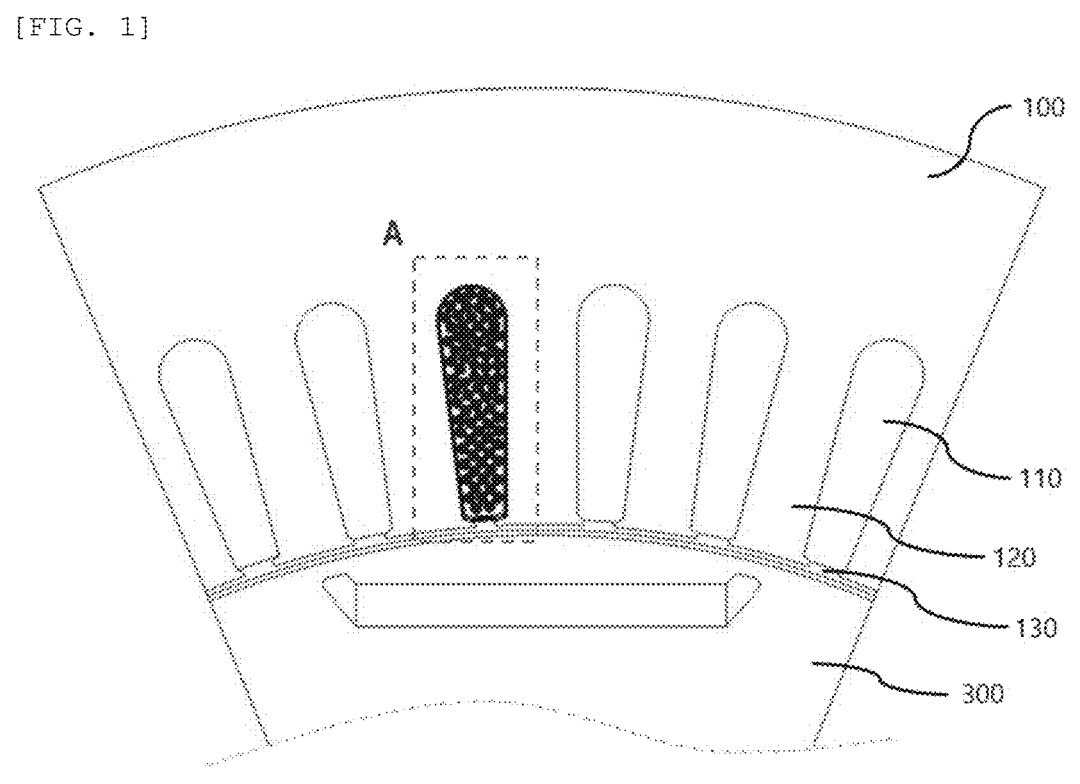
Figure 2:
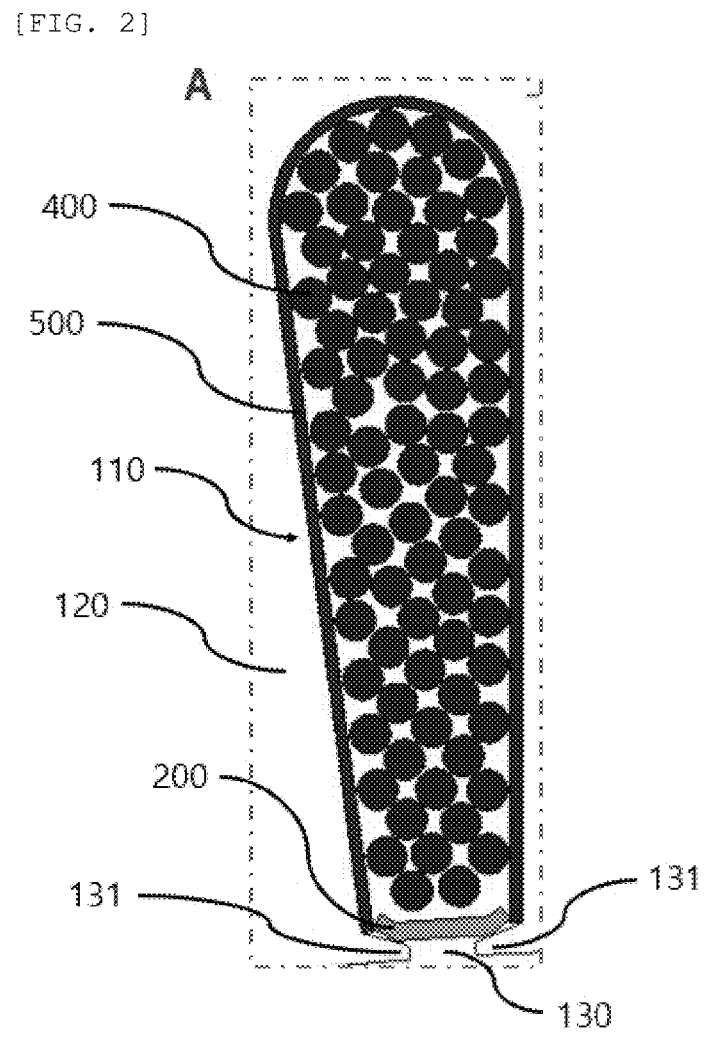

Referring to FIGS. 1 to 5, the insulation shielding member 200 according to the embodiments of the present disclosure may include a first insulation part 210, a shielding part 230, and a bent part 240.

The first insulation part 210 may be formed on one surface of the insulation shielding member, and insulate the stator core 100 and a coil 400 inserted into the slot 110 from each other.

The shielding part 230 may be formed on the other surface of the insulation shielding member, and shield an electric field caused by the coil 400.

The first insulation part 210 and the shielding part 230 may have a shape of overlapping sheets facing each other and in contact with each other.

The bent part 240 may have both ends each bent in one direction and seated inside confrontation parts 131 facing each other in the opening 130. Here, the confrontation part 131 may protrude from an end of the stator core 100, and the opening 130 of the slot 110 may be formed at a position where the confrontation parts 131 face each other.

The first insulation part 210 and the shielding part 230, which overlap each other, may each have a predetermined length bent at both of their ends in the same direction to form the bent part 240.

The pair of bent parts 240 may be seated inside the confrontation parts 131, and the insulation shielding member 200 may thus block the opening 130. The first insulation part 210 may face the coil 400 positioned in the slot 110, and the shielding part 230 may face the opening 130.

FIG. 3 shows an insulation shielding member 200-1 according to a first embodiment of the present disclosure.

In the insulation shielding member 200-1, the first insulation part 210 and the shielding part 230 may have the same width. The bent parts 240 may be formed on both the first insulation part 210 and the shielding part 230, and the shielding part 230 may be seated inside the confrontation part 131.

FIG. 4 shows an insulation shielding member 200-2 according to a second embodiment of the present disclosure.

In the insulation shielding member 200-2, a width L1 of the shielding part 230 may be longer than a width L2 of the opening 130 and shorter than a distance L3 between the bent parts 240.

The shielding part 230 may be seated on and in contact with the inner side of the confrontation part 131 without the bent part 240. In this case, it is possible to prevent breakage of the shielding part 230 which is bent and in contact with the confrontation part 131.

FIG. 5 shows an insulation shielding member 200-3 according to a third embodiment of the present disclosure.

The insulation shielding member 200-3 may further include a second insulation part 220. The shielding part 230 may be covered by the second insulation part 220 and disposed between the first insulation part 210 and the second insulation part 220.

Here, a width L4 of the second insulation part 220 may be longer than the distance L3 between the bent parts 240. Here, the width L1 of the shielding part 230 may be still longer than the width L2 of the opening 130. Therefore, the shielding part 230 may still block the opening 130 although the second insulation part 220 is seated on and in contact with the inner side of the confrontation part 131.

The width L4 of the second insulation part 220 is longer by at least 2 mm than the distance L3 between the bent parts 240.

Each of the first insulation part 210 and the second insulation part 220 may be a sheet such as an insulation paper having an insulation property. The shielding part 230 may be a conductive sheet having conductivity such as a silver foil or an aluminum foil.

The shielding part 230 may have a thickness of 0.1 mm or more. In addition, the width L1 of the shielding part 230 may be 1.05 times or more than the width L2 of the opening 130.

In the insulation shielding member 200-3 according to a third embodiment, the shielding part 230 may be positioned between the first insulation part 210 and the second insulation part 220, which are insulation parts, and the shielding part 230 may thus maintain a non-contact state with the stator core 100.

In addition, the first insulation part 210 and the second insulation part 220 may surround the shielding part 230, and accordingly, the shielding part 230 which is a conductive material may not be exposed to the outside. In this way, it is possible to prevent insulation failure that may occur when the shielding part 230 of the opening 13 is exposed. In addition, the shielding part 230 disposed inside may not be exposed to the outside, and may thus be in non-contact with the outside, thereby preventing damage such as scratches or tears due to the contact occurring in an assembly process. The opening 130 of the stator core 100 may be blocked by the insulation shielding member 200-3 in which the shielding part and the insulation part are integrated with each other, thus simplifying a manufacturing process.

In addition, in a case of the motor of an oil cooling system, the first insulation part 210 and the second insulation part 220 may surround the shielding part 230, thus preventing the shielding part 230 from being exposed to oil.

FIGS. 6 to 8 are views showing analysis results acquired by using the insulation shielding members according to the embodiments of the present disclosure.

FIG. 6A shows a portion of modeling for analysis acquired by applying the insulation shielding member. FIG. 6B shows a general equation related to capacitance C.

The insulation shielding member according to the present disclosure may be positioned in the opening 130 to reduce the capacitance between the coil 400 (or a winding), inserted into the slit 110 of the stator core 100, and the rotor 300.

That is, when the capacitance Cwr between the coil and the rotor is reduced, an axis voltage Vsh may be reduced as shown in the equation below.

$$v_{sh} = \frac{C_{wr}}{C_{sr} + C_{wr} + 2C_b} V_{cm} \qquad \text{[Equation 1]}$$

Vcm is an inverter voltage applied to the motor, and the axis voltage Vsh may be reduced by reducing Cwr. In general, capacitance Csr between the stator and the rotor is much larger than Cwr, and Cwr of the denominator in Equation 1 may thus be ignored. Therefore, when Cwr is reduced, the molecule becomes smaller to reduce the axis voltage.

Results of the modeling based thereon are shown in FIGS. 7 and 8. FIG. 7 is an analysis result acquired by not applying the insulation shielding member, and FIG. 8 is an analysis result acquired by applying the insulation shielding member.

The redder the color is, the more electric field occurring in the coil 400 passes through the opening, and the bluer the color is, the less electric field occurring in the coil 400 passes through the opening. As shown in FIG. 8, it is possible to significantly reduce the passage of the electric field through the opening by applying the insulation shielding member.

In addition, it is possible to configure the motor using the insulation shielding member according to the embodiments of the present disclosure.

A motor according to an embodiment of the present disclosure may include: a stator core 100 including a plurality of teeth parts 120 radially formed on its inner circumference, and a plurality of slots 110 each formed between teeth parts 120 and having an opening 130 formed between confrontation parts 131 facing each other at ends of the teeth parts 120; a coil 400 inserted into the slot 110; an insulation member 500 inserted between the slot 110 and the coil 400; an insulation shielding member 200 disposed in the opening 130 of the slot 110; and a rotor 300 having a rotation shaft 310 connected to its center, and inserted into the stator core 100 to be rotated relative to the stator core 100.

Here, the insulation shielding member 200 may use the insulation shielding member according to the embodiments of the present disclosure described above.

As set forth above, the insulation shielding member of the present disclosure may perform not only the insulation function but also the shielding function simultaneously.

In addition, the insulation shielding member of the present disclosure may shield the electric field caused by the coil to prevent the corrosion from occurring in the bearing, thereby reducing the vibration and noise of the motor.

The embodiments of the present disclosure have been described above for illustrative purposes, and those skilled in the art to which the present disclosure pertains will appreciate that various modification and other equivalent embodiments are possible therefrom. Therefore, those skilled in the art will fully understand that the present disclosure is not limited to the specific embodiments described in the detailed description above. Thus, the true technical scope of the present disclosure should be defined by the technical spirit of the appended claims. In addition, it is to be understood that the present disclosure includes all modifications, equivalents, and substitutes within the spirit and scope of the present disclosure as defined by the appended claims.

What is claimed is:

1. A motor comprising:

a stator core including a plurality of teeth parts radially disposed on an inner circumference of the stator core, and a plurality of slots each disposed between the teeth parts and having an opening between confrontation parts facing each other at ends of the teeth parts;

a coil disposed in the slot;

an insulation member disposed between the slot and the coil;

an insulation shielding member disposed in the opening of the slot; and a rotor having a rotation shaft connected to a center of the rotor, and disposed in the stator core to be rotated relative to the stator core, wherein the insulation shielding member comprises:

a first insulation part disposed on one surface of the insulation shielding member, and insulating the stator core and the coil inserted into the slot from each other;

a shielding part disposed on another surface of the insulation shielding member;

a second insulation part covering the shielding part; and bent parts having ends, each bent in one direction and disposed inside confrontation parts facing each other in the opening, the ends of the bent parts are respectively disposed in a space between end portions of inner walls of the insulation member, a width of the shielding part is longer than a width of the opening and shorter than a distance between the bent parts and a width of the second insulation part is longer than the distance between the bent parts.

2. The motor of claim 1, wherein the shielding part is configured to shield an electric field caused by the coil.

* * * * *